May 21, 1929.  H. B. P. HUMPHRIES  1,714,026
ANTISLIPPING TREAD
Filed Aug. 25, 1926
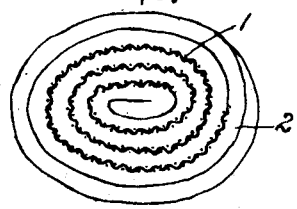
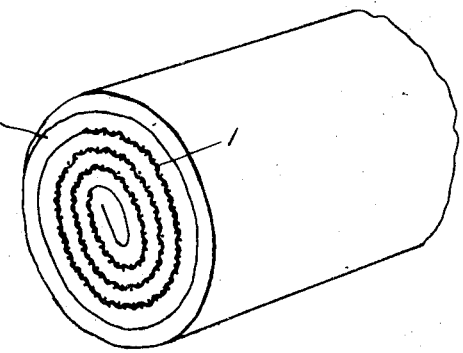
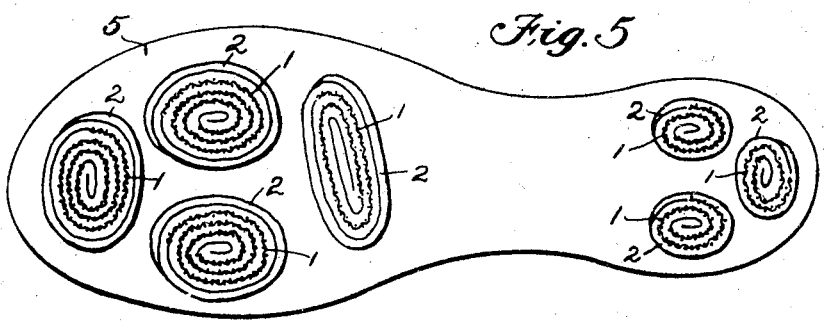
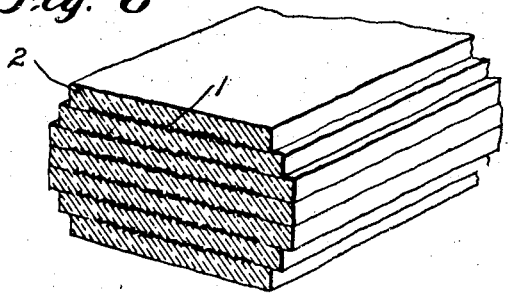
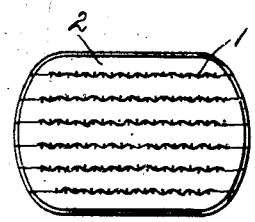
Inventor
Herbert Brooke Perren Humphries
by Roberts, Cushman & Woodberry
Att'ys Patented May 21, 1929.

1,714,026

UNITED STATES PATENT OFFICE.

HERBERT BROOKE PERREN HUMPHRIES, OF LONDON, ENGLAND.

ANTISLIPPING TREAD.

Application filed August 25, 1926, Serial No. 131,384, and in Great Britain September 30, 1925.

The present invention relates to treads for footwear and a method of making the same. More particularly the invention relates to improvements in elastic or cushion treads particularly adapted for preventing slipping or sliding on wet pavements or other surfaces on which slipping is likely to occur and to a novel method by which the improved tread may be made.

A form of cushioning tread commonly employed comprises soles of unvulcanized or crepe rubber, this material being resistant to wear and highly elastic, so that very little jar takes place when soles of this kind are used. Furthermore, this material has the quality of sticking to substantially all dry surfaces, but has the particularly objectionable feature that on wet pavements there is substantially no friction; or in other words, there is a very low co-efficient of friction between unvulcanized or crepe rubber and wetted surfaces of asphalt, concrete, brick, stone, and other material employed for pavements.

It is the primary object of the present invention to provide a new form of tread for footwear which is particularly adapted to prevent slipping or sliding on wet pavements and other surfaces, and which embodies the advantages of unvulcanized or crepe rubber when applied to or incorporated in treads for footwear.

Another object of the invention is to provide a method of making the product of my invention which shall be rapid and efficient.

While the anti-slipping tread made in accordance with this invention may be incorporated in the crepe sole and/or heel itself, it is preferably embodied in a pad which is applied to the bottom surface of an ordinary crepe sole; and while it is believed that the principal utility of the invention is for treads for footwear, it is also applicable to various other uses, such as clutches or other friction surfaces, to prevent or reduce slipping, especially under conditions when oil or water comes between the engaging surfaces.

A principal characteristic of the invention is that fibrous sheet material is incorporated and embedded in the tread of crepe rubber in such manner as to be exposed edgewise at the operating surface of the tread. Preferably the sheet material used is rubberized woven textile fabric, although other materials may be used; and preferably the tread is built up in a laminated structure presenting to the working surface alternate layers of crepe rubber and the edges of the fibrous sheet material. The layers of sheet material tend somewhat to increase the durability and stiffness of the crepe tread, as well as to impart to it non-slipping qualities, without detracting from the desirable inherent properties of crepe rubber. Other features of the invention will hereinafter be described and pointed out in the claims.

The invention is illustrated by way of example in its preferred embodiment and in a modified form in the accompanying drawings, in which:

Fig. 1 is a plan view of my preferred form of friction or anti-slipping tread in the form of a pad;

Fig. 2 is a side view of a strip of unvulcanized or crepe rubber having attached thereto a sheet material illustrating a step in the method of making my anti-slipping tread, preparatory to rolling the material into the final form from which the pads or treads may be cut;

Fig. 3 is a view in perspective of a roll formed from the united sheets shown in Fig. 2;

Fig. 4 is a cross-sectional view taken on the line 4—4 of Fig. 1;

Fig. 5 is a plan view of a tread or sole to which the form of the invention shown in Fig. 1 has been applied;

Fig. 6 is a view in perspective showing a modified method of forming a laminated body from which sheets or pads of the desired thickness may be cut; and Fig. 7 is a plan view of a pad sliced from the laminated body shown in Fig. 6, and trimmed and beveled at its edges.

Referring more in detail to the drawings, Fig. 1 illustrates the preferred embodiment of my invention in which a strip or sheet of woven textile material 1 is embedded in a body of unvulcanized or crepe rubber 2 in such a manner that the strip or sheet extends through and is exposed edgewise to the operating surface or working surface of the body. The body is preferably in the form of a pad of oval shape of a thickness of about one-eighth inch and has an outer rim or margin of crepe rubber about one-quarter inch thick around the convolutions or edgewise extending portions of fabric. This body may be cemented or attached to the tread or sole of a shoe, as shown in Fig. 5, in any desired manner; or if desired the parts may be made integral with the sole or tread, or the whole sole may be made in one part having the sheet material extending edgewise into the exposed surface throughout the sole or tread. The body may be made in other shapes than the oval shape, such as in diamond shape, or circular or in oblong form, although I preferably employ the oval shape having convolutions of fabric material or other suitable friction producing material for the reason that the friction produced thereby is substantially the same in all directions.

In the preferred form of the invention illustrated in Fig. 1, the sheet material 1 is in the form of convolutions so that the exposed edge of the sheet material is in the form of a spiral on the operating surface of the tread. This form of the invention is preferably made by taking a sheet of crepe rubber or unvulcanized rubber and applying cement or a suitable adhesive material to one end thereof and doubling over or uniting this end portion, such as portion 3 in Fig. 2, whereby a core adapted to provide an inner portion of the finished roll is formed. Upon this rubber sheet is attached the sheet of the material to be embedded, which is preferably a coarse, woven textile material, although I may employ leather or inorganic fabric or other sheet material having fibers therein which is adapted to develop friction on a wet surface so as to prevent slipping when in contact therewith. The sheet of textile material or other material which is to be embedded is preferably of a width less than that of the rubber so as to leave a substantial length of the rubber base uncovered, as illustrated at 4 in Fig. 2 of the drawings, whereby when the material is rolled together so as to form the convolutions of the anti-slipping material, the portion 4 will serve as a sealing end producing a shell or casing of rubber in which none of the sheet material will be exposed. The end 4 is preferably chamfered so that in forming the roll the free end will unite with the body portion so as to form a substantially continuous surface. The sheet material may be treated with a rubber solution, such as latex, and united to the rubber material; or the sheet material may be cemented to the rubber base by means of a rubber cement; or the materials may be united by applying a suitable rubber solvent to the surface of the rubber base, whereby when the sheet material is laid on the rubber sheet, the sheet material will become impregnated with the dissolved unvulcanized rubber and serve as a binding medium between the sheet material and the unvulcanized rubber base. In a similar manner the adjacent portions of the material when rolled may be made to adhere to each other, the combined sheets being rolled together in any suitable manner. After the roll has been formed it may be pressed or molded, as desired, and may be permitted to dry and set before the cutting operation in which the pads or treads are formed.

In forming the anti-slipping tread from the roll shown in Fig. 3, the pads or treads are preferably cut therefrom in a direction so that the cut will not be parallel to the direction of the threads in the textile material. In the preferred form of the invention the sheets are so laid on the rubber base that the cuts may be made transversely to the axis of the roll without running parallel to the warps or wefts therein. The textile sheets may, however, be laid on the rubber base so as to require cutting at an angle other than a right angle to the longitudinal axis of the roll. The angle at which the roll is cut depends also upon the shape of the pad to be obtained therefrom, but in any case the sections should be cut so as not to be parallel to the wefts or warps to prevent raveling or fraying of the fabric.

After the treads or pads have been cut from the roll or body of the material, the outer edge of the slice is preferably chamfered as best shown in Fig. 4.

While the above method comprises the preferred manner of making the anti-slipping tread of my invention, it is to be understood that the fabric or other material may be embedded in another manner, such as by sewing or lacing or by interweaving or otherwise interlaying the material in the rubber; and the pads or treads may be made separately as a unit, if desired. As above pointed out, however, it is of the utmost importance that the edges of the fabric, or other material employed to prevent slipping, be exposed in the wear surface of the pad or tread.

In the modified method of forming the anti-slipping tread or pad shown in Figs. 6 and 7, I may place the layers or sheets of unvulcanized rubber and fibrous sheet material alternately on each other so as to form a laminated structure from which treads or friction pads may be made, presenting frictional intervals to the ground surface. The fibrous sheet material employed for the purpose is preferably of a width less than that of the rubber sheets, whereby at the outside portion of the material there will be no exposed portions of the fibrous sheet material. In the building up of the laminated body, strips of the crepe or unvulcanized rubber may be laid at the outside of the sheet material so as to attain the required thickness at the outside of the body. After the rubber sheets and textile material or other fibrous material employed has been suitably cemented together or otherwise attached, the pads or treads may be formed therefrom by cutting the body transversely to or through the layers, so that the portions cut therefrom comprise bodies in which the sheet material is exposed edgewise to the wear surface or operating surface thereof.

In cutting each section, as illustrated in Fig. 7, for example, from the laminated body shown in Fig. 6, care should be taken that the fabric should be so laid that when cut to form the pad it shall be cut on the bias for the reason that if the material were cut parallel to the threads, there would be threads lying close to the surface and parallel thereto which would become loosened and detached.

As above stated, the sheet of fibrous material is preferably a woven textile material, such as cotton cloth or canvas which have been found suitable, but wool, leather, and other materials having the desired properties may also be employed for this purpose. The sheet material which is to be united to the crepe rubber may be treated before being connected thereto with a rubber solution, or latex, to rubberize the surfaces, and may be dried or aged to the desired extent before being embedded in the crepe rubber sheets. The rubber sheets employed are preferably about one-eighth of an inch thick and may be of any suitable size or form. The fabric sheet employed may be divided lengthwise into strips if desired and laid in individual strips instead of in a continuous sheet in the manner illustrated in Fig. 6 of the drawings. After the various sheets and rubber strips have been suitably united, the roll may be pressed or molded so as to attain the desired density. The fibrous sheets are preferably smaller than the rubber sheets so that when united therewith an outside margin or casing of rubber about one-fourth of an inch in thickness is produced around the outside of the body.

The pads or anti-slipping treads may be attached to or secured in soles or treads by cementing or by other suitable means, or, if desired, the anti-slipping treads may be made integral with the soles, such as crepe rubber soles for example, although I preferably attach the pads in the manner above stated. After the pads have been formed from the roll or from the laminated body above described, they may be trimmed or finished to attain the desired sizes and shapes. The pads may also be used directly after they are cut from the larger body, or as above stated the pads or treads may be made separately without first forming the roll or laminated body.

It is to be understood that various changes or modifications may be made in the article of manufacture and the method of producing the same without departing from the spirit or scope of the invention as defined in the claims.

I claim:

1. A friction material of the kind described comprising a body of unvulcanized or crepe rubber having a rubberized sheet of fibrous material embedded in the body and exposed edgewise at the operating surface thereof.

2. An anti-slipping tread adapted for the tread surface of footwear which comprises a body of unvulcanized or crepe rubber having embedded therein a sheet of textile material cemented to the body of the said rubber, said material being wound in convolutions therein so that the exposed edge thereof presents substantially the form of a spiral.

3. An anti-slipping tread which comprises a woven textile material embedded in convolutions in unvulcanized or crepe rubber so as to expose an edge thereof in a spiral in the operating surface, the exposed edges of said textile material being cut on the bias, the central portion of the tread being formed of the unvulcanized rubber without textile fabric embedded therein.

4. A method of making anti-slip material containing crepe rubber which comprises forming lamellæ of crepe or unvulcanized rubber and a fibrous sheet material, uniting the lamellæ by a suitable binding medium at a temperature below that of vulcanization and cutting slices from the material so as to present an operating surface in which the fibrous sheet material is exposed edgewise therein.

5. A method of making anti-slip treads which comprises forming a loaf of alternate layers of adhering unvulcanized or crepe rubber and a woven textile material in which the layers of said material are so laid that when the said loaf is cut transversely to the longitudinal axis the said woven material will be cut on a bias and cutting said loaf into sections transversely to the longitudinal axis thereof.

6. An anti-slipping tread which comprises a woven textile fabric embedded in convolutions in unvulcanized or crepe rubber so as to expose an edge thereof in a spiral at the operating surface of the tread, the entire outer portion of the tread being formed of convolutions of rubber in direct contact with each other without the textile fabric therebetween, whereby a comparatively soft region is provided about the fabric.

7. A method of making anti-slip treads which comprises uniting a sheet of unvulcanized or crepe rubber with a sheet of woven textile material of less extent than the rubber sheet so that the ends of the latter extend beyond the textile material, forming the united sheets into a roll with the inner portion of the roll formed by one end of the rubber sheet that is free from the textile fabric and with the outer portion of the roll formed by the opposite end of the rubber sheet that is free from the fabric, uniting the contacting portions of the roll thus formed, and cutting treads from the roll so that an operating surface is provided in which the convolutions of the textile material are exposed edgewise, the tread being provided with a center and an outer portion both of which are free from textile material.

8. A method of making anti-slip treads which comprise uniting a sheet of unvulcanized or crepe rubber with a sheet of woven textile material of less extent than the rubber sheet so that one end of the latter extends beyond the textile material, forming the united sheets into a roll with the outer portion of the roll formed by an end of the rubber sheet that is free from the fabric, uniting the contacting portions of the roll thus formed, and cutting treads from the roll so that an operating surface is provided in which convolutions of the textile material are exposed edgewise, the tread being provided with an outer portion which is free from textile material.

Signed by me at Boston, Massachusetts, this 3rd day of August, 1926.

HERBERT BROOKE PERREN HUMPHRIES.